(12) United States Patent
Holtmanns et al.

(10) Patent No.: US 9,622,070 B2
(45) Date of Patent: Apr. 11, 2017

(54) UPDATING SUBSCRIPTION INFORMATION

(75) Inventors: Silke Holtmanns, Klaukkala (FI); Rune Lindholm, Sottunga (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/395,046

(22) PCT Filed: Apr. 23, 2012

(86) PCT No.: PCT/IB2012/052043
§ 371 (c)(1),
(2), (4) Date: Oct. 16, 2014

(87) PCT Pub. No.: WO2013/160725
PCT Pub. Date: Oct. 31, 2013

(65) Prior Publication Data
US 2015/0126184 A1 May 7, 2015

(51) Int. Cl.
*H04M 1/66* (2006.01)
*H04M 1/68* (2006.01)
*H04M 3/16* (2006.01)
*H04W 8/20* (2009.01)
*H04L 29/12* (2006.01)
*H04W 8/08* (2009.01)
(Continued)

(52) U.S. Cl.
CPC ............ *H04W 8/20* (2013.01); *H04L 61/6054* (2013.01); *H04W 8/08* (2013.01); *H04W 48/18* (2013.01); *H04W 88/005* (2013.01)

(58) Field of Classification Search
CPC ....... H04W 8/20; H04W 8/08; H04W 88/005; H04W 48/18; H04L 61/6054
See application file for complete search history.

(56) References Cited

U.S. PATENT DOCUMENTS 6,285,869 B1    9/2001  Shannon et al.
8,438,145 B2 *  5/2013  Bardsley ........... G06F 17/30864
                                             706/15
(Continued)

FOREIGN PATENT DOCUMENTS

CN        1652557 A       8/2005
WO     2011036484 A2      3/2011

OTHER PUBLICATIONS

International Search Report and Written Opinion received for corresponding Patent Cooperation Treaty Application No. PCT/IB2012/052043, dated Mar. 20, 2013, 16 pages.
(Continued)

*Primary Examiner* — Erin File
(74) *Attorney, Agent, or Firm* — Alston & Bird LLP

(57) ABSTRACT

Various methods are described for providing updated network subscription information for a device to one or more other devices. One example method may comprise establishing a first subscription associated with a first network operator for a device. The method may further comprise transferring the device from the first subscription associated with the first network operator to a second subscription associated with a second network operator. Additionally, the method may comprise updating one or more other devices identified in a connection map associated with the device of the transfer to the second subscription. Similar and related methods, apparatuses, and computer program products are also provided.

18 Claims, 5 Drawing Sheets

(51) Int. Cl.
H04W 48/18 (2009.01)
H04W 88/00 (2009.01)

(56) References Cited

U.S. PATENT DOCUMENTS

| | | | |
|---|---|---|---|
| 8,924,999 B1* | 12/2014 | Santangelo | H04N 21/25875 725/10 |
| 2005/0075106 A1 | 4/2005 | Jiang | |
| 2006/0229063 A1* | 10/2006 | Koch | H04M 1/274516 455/414.1 |
| 2008/0051083 A1* | 2/2008 | Madej | H04W 8/02 455/435.1 |
| 2008/0089487 A1* | 4/2008 | Chen | H04M 1/274516 379/88.12 |
| 2009/0240657 A1* | 9/2009 | Grigsby | G06Q 10/10 |
| 2009/0286509 A1* | 11/2009 | Huber | G06Q 20/1235 455/410 |
| 2009/0298489 A1* | 12/2009 | Chitturi | G06Q 10/10 455/418 |
| 2010/0048197 A1 | 2/2010 | Jiang | |
| 2010/0120453 A1* | 5/2010 | Tamchina | H04M 1/274516 455/466 |
| 2010/0159924 A1 | 6/2010 | Lagerman et al. | |
| 2011/0269430 A1 | 11/2011 | Di Donato et al. | |
| 2012/0052861 A1 | 3/2012 | Holtmanns | |
| 2012/0282924 A1* | 11/2012 | Tagg | H04W 8/04 455/432.1 |
| 2012/0295618 A1* | 11/2012 | Ahmavaara | H04W 8/02 455/435.1 |
| 2013/0040661 A1* | 2/2013 | Grube | H04L 12/1895 455/456.3 |

OTHER PUBLICATIONS

"System for Dynamic User ID Changes in a Communication System", IBM, Jun. 20, 2008, IP Com Journal, IP.com Inc., West Henrietta, NY, US.

Apple Granted Patent Where Carriers Bid to Provide Service to iPhones [online] [retrieved Dec. 8, 2015] Retrieved from the Internet: <URL: http://appleinsider.com/articles/11/02/09/apple_granted_patent_where_carriers_bid_for_iphone_service.html>. (dated Feb. 8, 2011) 9 pages.

Apple Wins Patent for Wireless Activation System for AT&T, Verizon & More [online] [retrieved Dec. 8, 2015] Retrieved from the Internet: <URL: http://www.patentlyapple.com/patently-apple/2011/04/apple-wins-patent-for-wireless-activation-system-for-att-verizon-more.html>. (dated Apr. 19, 2011) 8 pages.

Extended European Search Report from corresponding European Patent Application No. 12875556.8 dated Nov. 12, 2015.

Multiple Carrier Profiles & Schematic Maps May Be on iPhone's Roadmap—Patently Apple [online] [retrieved Dec. 8, 2015] Retrieved from the Internet: <URL: http://www.patentlyapple.com/patently-apple/2011/08/multiple-carrier-profiles-schematic-maps-may-be-on-iphones-roadmap.html>. (dated Aug. 15, 2011) 7 pages.

Oberthur Technologies, Roaming Broker [online] [retrieved Dec. 8, 2015] Retrieved from the Internet: <URL: http://www.oberthur.com/get_downloadsection_file.aspx?id=141>. (dated Jan. 13, 2010) 4 pages.

Smart Cards; Embedded UICC; Requirements Specification; Draft ETSI TS 103 383 v<0.0.1>; May 2011; 27 pages.

* cited by examiner

UPDATING SUBSCRIPTION INFORMATION

RELATED APPLICATION

This application was originally filed as Patent Cooperation Treaty Application No. PCT/IB2012/052043 filed Apr. 23, 2012.

TECHNICAL FIELD

Embodiments of the present invention relate generally to communication technology, and, more particularly, relate to a method and apparatus for providing updated network subscription information for a device to one or more other devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Due at least in part to the expansion of wireless networking technologies, many options are available to the consumer with respect to network operators and the services and quality of service they provide.

SUMMARY

Methods, apparatuses, and computer program products are herein provided for providing updated network subscription information for a device to one or more other devices. In an example embodiment, a method is provided, which may comprise establishing a first subscription associated with a first network operator for a device; transferring the device from the first subscription associated with the first network operator to a second subscription associated with a second network operator; and updating one or more other devices identified in a connection map associated with the device of the transfer to the second subscription.

In another embodiment, an apparatus is provided that includes at least one processor and at least one memory including computer program code with the at least one memory and the computer program code being configured to, with at least one processor, cause the apparatus to at least establish a first subscription associated with a first network operator for a device; transfer the device from the first subscription associated with the first network operator to a second subscription associated with a second network operator; and update one or more other devices identified in a connection map associated with the device of the transfer to the second subscription.

In a further embodiment, a computer program product is provided that includes at least one non-transitory computer-readable storage medium having computer-readable program instructions stored therein with the computer-readable program instructions including program instructions configured to establish a first subscription associated with a first network operator for a device; transfer the device from the first subscription associated with the first network operator to a second subscription associated with a second network operator; and update one or more other devices identified in a connection map associated with the device of the transfer to the second subscription.

In yet another embodiment, an apparatus is provided that includes means for establishing a cellular network connection to an access point; means for establishing a first subscription associated with a first network operator for a device; means for transferring the device from the first subscription associated with the first network operator to a second subscription associated with a second network operator; and means for updating one or more other devices identified in a connection map associated with the device of the transfer to the second subscription.

In an example embodiment, a method is provided, which may comprise transferring from a first subscription associated with a first network operator to a second subscription associated with a second network operator, wherein transferring from the first subscription to the second subscription comprises modifying a device identifier; and updating one or more devices identified in a connection map with the modified device identifier.

In another embodiment, an apparatus is provided that includes at least one processor and at least one memory including computer program code with the at least one memory and the computer program code being configured to, with at least one processor, cause the apparatus to at least transfer from a first subscription associated with a first network operator to a second subscription associated with a second network operator, wherein transferring from the first subscription to the second subscription comprises modifying a device identifier associated with the apparatus; and update one or more devices identified in a connection map with the modified device identifier associated with the apparatus.

In a further embodiment, a computer program product is provided that includes at least one non-transitory computer-readable storage medium having computer-readable program instructions stored therein with the computer-readable program instructions including program instructions configured to transfer from a first subscription associated with a first network operator to a second subscription associated with a second network operator, wherein transferring from the first subscription to the second subscription comprises modifying a device identifier; and update one or more devices identified in a connection map with the modified device identifier.

In yet another embodiment, an apparatus is provided that includes means for transferring from a first subscription associated with a first network operator to a second subscription associated with a second network operator, wherein means for transferring from the first subscription to the second subscription comprises means for modifying a device identifier associated with the apparatus; and means for updating one or more devices identified in a connection map with the modified device identifier associated with the apparatus.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

Figure 4:
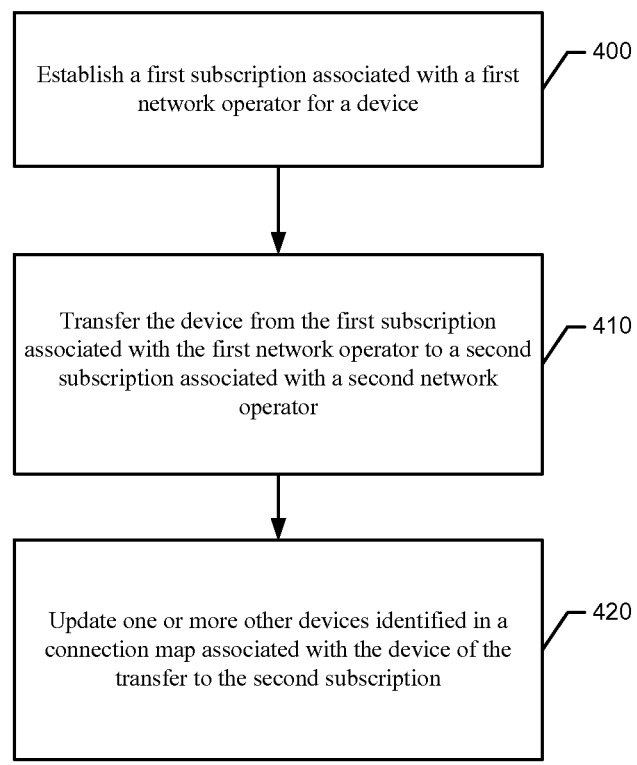
Figure 5:
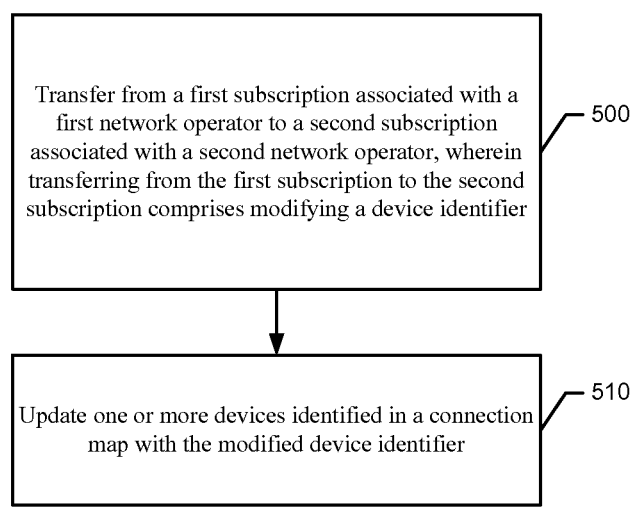

FIG. 4 illustrates a flowchart according to an example method for providing updated network subscription information for a device to one or more other devices according to some example embodiments of the present invention; and FIG. 5 illustrates a flowchart according to an example method for providing updated network subscription information for a device to one or more other devices according to some example embodiments of the present invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media or volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, integrated circuit chips, systems on chip, smart card, removable memory card, any other non-transitory magnetic or optical medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) and/or core(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

Due at least in part to the mobility of a user device, the user device may constantly be presented with the potential to access a network controlled by a network operator having favorable qualities to the network to which the user device is currently connected. As a result, a user may not wish to be bound to her current network subscription when more favorable networks are available (for example, cheaper access or better services). A problem may result, however, if the user device is constantly switching networks. For instance, the identifiers used to identify the user device to the particular network and to allow other users to contact the user device may be constantly changing as well and make it difficult for others to reach this particular user. Accordingly, it may be desirable to provide systems, methods, apparatuses, and computer program products for improving the ability of a user device to constantly change subscriptions among available networks as desired while providing an efficient solution for updating other devices with the new subscription information of the user device. Current solutions for number portability are not designed or suitable for a large amount of users and high flexibility.

Example embodiments of the present invention provide methods and apparatuses for providing updated network subscription information for a user device to one or more other user devices. A user device may be associated with a subscription broker that helps identify desirable networks (for example, cheap, fast, efficient networks) to which the user device may subscribe at any given location or time. In one example, a user device may be connected to a first network controlled by a first network operator when the subscription broker identifies a second network controlled by a second network operator that would be preferable to the user device. The subscription broker may provide subscription information to the user device for connecting to the preferred second network.

Once the user device connects to the second network, in these example embodiments, other devices that may wish to contact the user device may be contacted to provide new contact information for the user device in the second network. For example, the subscription broker, which may also be referred to as a subscription manager, may provide a service to which the user of the user device and all of his contacts (for example, friends, family, colleagues, etc.) may subscribe. These contacts, along with their own contact information, may be stored in a connection map. When the user device transfers to a new network (for example, the second network), the user device in cooperation with the subscription broker may provide the new contact information to all of the contacts identified in the connection map. In this way, some embodiments of the invention may provide additional flexibility to a user device for changing network subscriptions while allowing other users to continue to reach the user device in the new network. Additionally, some embodiments of the present invention may prevent the need to constantly update routing tables and/or databases, which may be costly and inefficient and which may lead to a poor user experience and low network performance.

Figure 1:
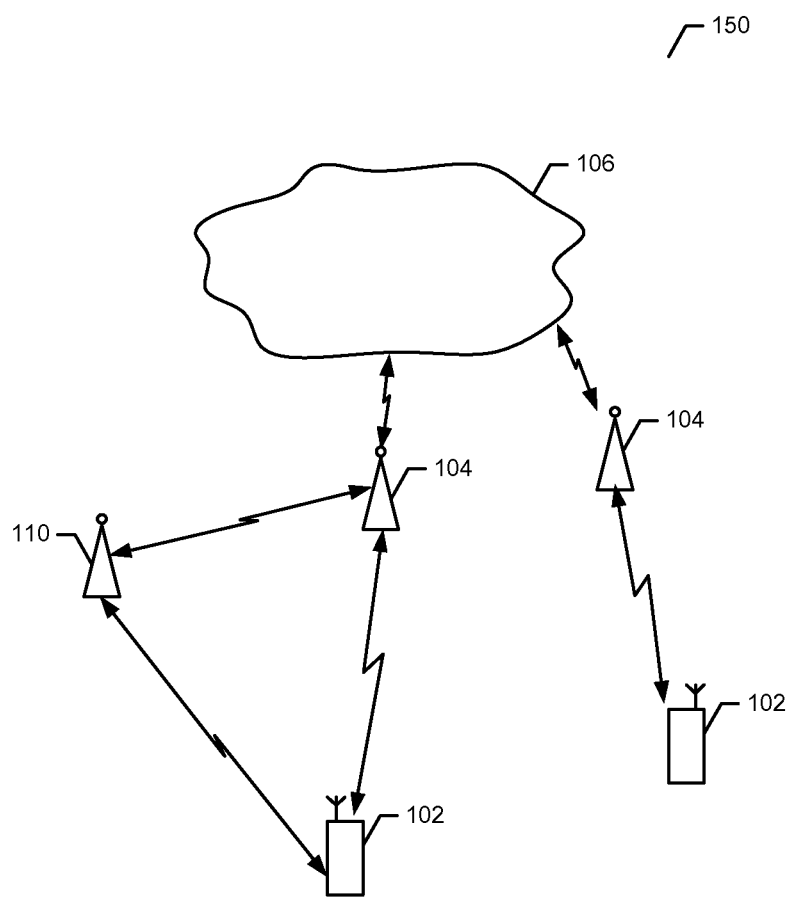
FIG. 1 illustrates a system for providing updated network subscription information for a device to one or more other devices according to some example embodiments of the present invention.

Referring now to FIG. 1, FIG. 1 illustrates a block diagram of a system 150 for providing updated network subscription information for a device to one or more other devices according to an example embodiment. It will be appreciated that the system 150 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for providing updated network subscription information for a device to one or more other devices, numerous other configurations may also be used to implement embodiments of the present invention.

The system 150 may include one or more terminal apparatuses 102, one or more serving network apparatuses 104, and one or more subscription brokers 110. The system 150 may further comprise a network 106. The network 106 may comprise one or more wireline networks, one or more wireless networks, or some combination thereof. The network 106 may, for example, comprise a serving network (for example, a serving cellular network) for one or more terminal apparatuses 102. The network 106 may comprise, in certain embodiments, one or more of the terminal apparatuses 102, serving network apparatuses 104, and/or subscription brokers 110 themselves. According to example embodiments, the network 106 may comprise the Internet. The network 106 may comprise, in some embodiments, a Content Delivery Network (CDN), which may also be referred to as a Content Distribution Network. In various embodiments, the network 106 may comprise a wired access link connecting one or more terminal apparatuses 102 to the rest of the network 106 using, for example, Digital Subscriber Line (DSL) technology. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third and Fourth Generation Partnership Project (3GPP) LTE (also referred to as LTE-A) standards, current and future implementations of International Telecommunications Union (ITU) International Mobile Telecommunications—Advanced (IMT-A) systems standards, and/or the like. In certain embodiments, the network 106 may employ other mobile access mechanisms such as Universal Mobile Telecommunications System (UMTS), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data GSM Environment (EDGE), and/or the like, or wireless network techniques, such as 6LoWpan, Wi-Fi low power, Institute of Electrical and Electronics Engineers (IEEE) 802.11 techniques, IEEE 802.15 techniques, IEEE 802.16 techniques, and/or the like. It will be appreciated, however, that where references herein are made to a network standard and/or terminology particular to a network standard, the references are provided merely by way of example and not by way of limitation.

According to various embodiments, one or more terminal apparatuses 102 may be configured to connect directly with one or more serving network apparatuses 104 and/or one or more subscription brokers 110 via, for example, an air interface without routing communications via one or more elements of the network 106. Alternatively, one or more of the terminal apparatuses 102 may be configured to communicate with one or more of the serving network apparatuses 104 and/or one or more subscription brokers 110 over the network 106. In this regard, the serving network apparatuses 104 and/or subscription brokers 110 may comprise one or more nodes of the network 106. For example, in some example embodiments, the serving network apparatuses 104 and/or subscription brokers 110 may be at least partially embodied on one or more computing devices that comprise an element of a radio access network (RAN) portion of the network 106. In this regard, the serving network apparatuses 104 and/or subscription brokers 110 may, for example, be at least partially embodied on an access point of the network 106 (for example, a macrocell, microcell, picocell, femtocell, closed subscriber group (CSG) cell, base station, base transceiver station (BTS), node B, evolved node B (eNB), home eNB, access point (AP), group owner, mesh station (STA), mesh point, and/or the like), which may, for example be configured to provide access to the network 106 (for example, via a radio uplink) to one or more of the terminal apparatuses 102. Accordingly, each of the serving network apparatuses 104 and/or subscription brokers 110 may comprise a network node or a plurality of network nodes collectively configured to perform one or more operations attributed to the serving network apparatus 104 and/or subscription broker 110 as described with respect to various example embodiments disclosed herein.

In some embodiments, the one or more subscription brokers 110 may be at least partially embodied on a terminal apparatus 102 or a serving network apparatus 104. In other embodiments, the one or more subscription brokers 110 may be embodied as separate entities. According to example embodiments, the subscription brokers 110 and/or serving network apparatuses 104 may be at least partially embodied as a database, for example a subscription database for managing and/or monitoring the network subscriptions of one or more terminal apparatuses 102 connected to the network 106.

A terminal apparatus 102 may be embodied as any computing device, such as, for example, a desktop computer, laptop computer, mobile terminal, mobile computer, mobile phone, mobile communication device, tablet computing device, game device, digital camera/camcorder, audio/video player, television device, radio receiver, digital video recorder, positioning device, wrist watch, portable digital assistant (PDA), fixed transceiver device (for example, attached to traffic lights, energy meters, light bulbs, and/or the like), a chipset, an apparatus comprising a chipset, any combination thereof, and/or the like.

Figure 2:
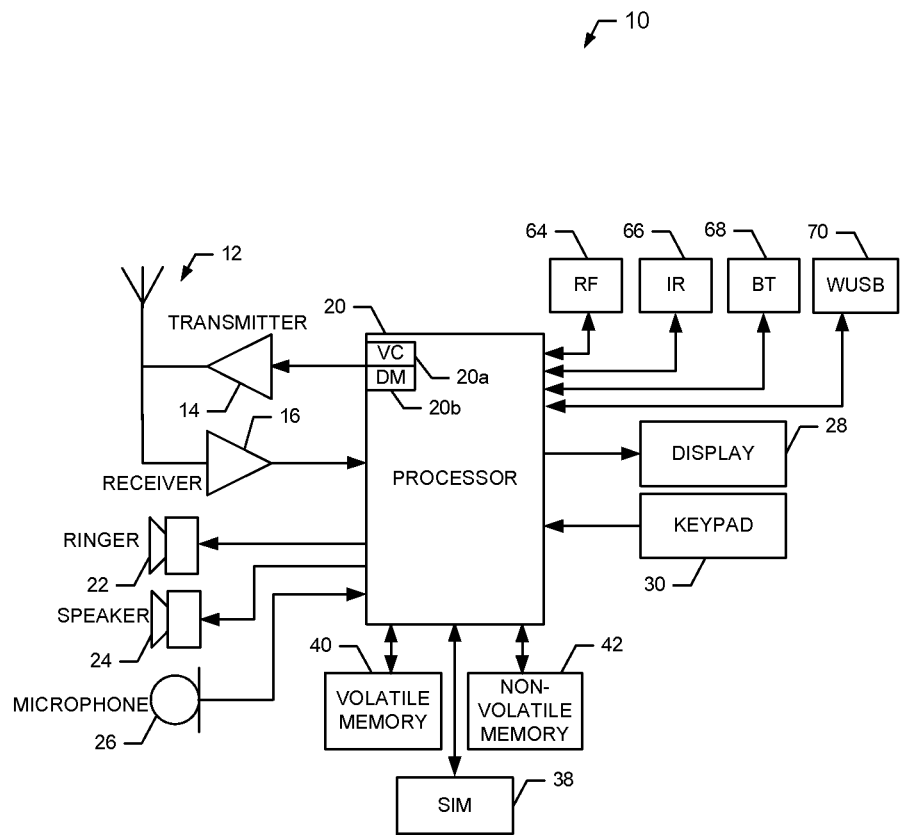
FIG. 2 illustrates a schematic block diagram of a mobile terminal according to some example embodiments of the present invention.

In some example embodiments, a terminal apparatus 102 may be embodied as a mobile terminal, such as that illustrated in FIG. 2. In this regard, FIG. 2 illustrates a block diagram of a mobile terminal 10 representative of one embodiment of a terminal apparatus 102. It should be understood, however, that the mobile terminal 10 illustrated and hereinafter described is merely illustrative of one type of computing device (for example, terminal apparatus 102) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Bluetooth™ (BT), local LTE, Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX™) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20*a*, an internal data modem (DM) 20*b*, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using Transmission Control Protocol/Internet Protocol (TCP/IP) and/or User Datagram Protocol (UDP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38 that in some instances may be embodied as an application executing on a removable or non-removable Universal Integrated Circuit Card (UICC), a soft USIM 38, a fixed USIM 38, a removable user identity module (R-UIM), IP Multimedia Services Identity Module (ISIM), CDMA Subscriber Identity Module (C-SIM), and/or the like, which may store information elements related to a mobile subscriber. In some embodiments, a plurality of network access applications or subscriptions (for example, ISIM, USIM, SIM, and/or the like) may be stored on one physical entity (for example, an embedded UICC, a fixed or removable UICC card, all or a portion of the baseband chip, and/or the like). In addition to the SIM, the mobile terminal may comprise other removable and/or fixed memory and/or other service related applications and data bound to the subscription. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, device certificate, secure chip certificate, integrated circuit card identifier (ICC-ID) (for example, in an embodiment having an embedded security chip), and/or the like, capable of uniquely identifying the mobile terminal 10.

Figure 3:
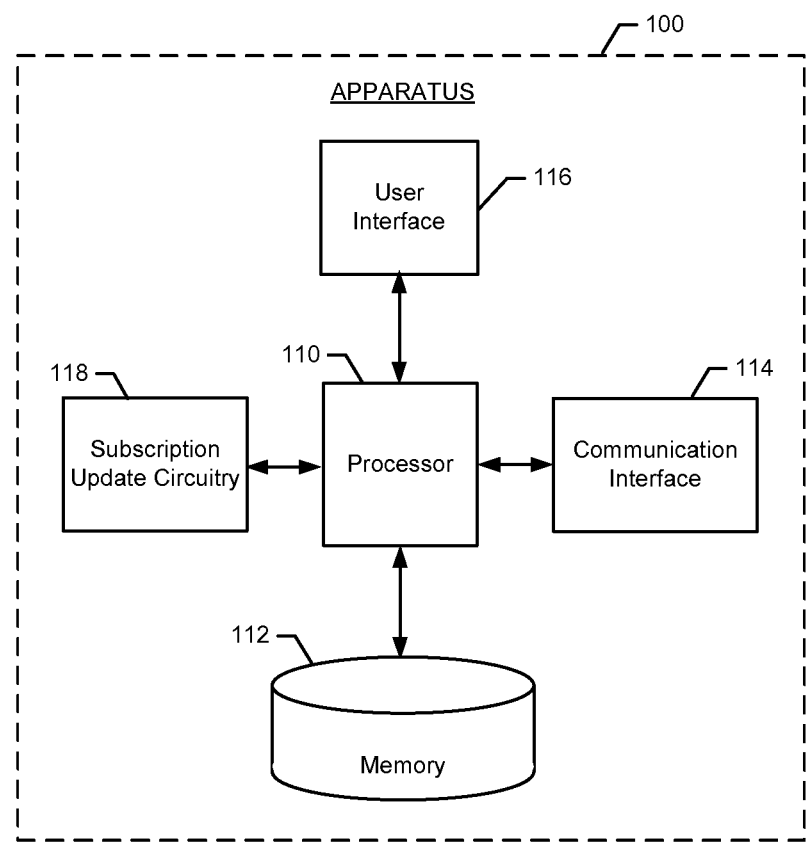
FIG. 3 illustrates a block diagram of an apparatus according to some example embodiments of the present invention.

In various embodiments, for example, a terminal apparatus 102, a serving network apparatus 104, and/or a subscription broker 110 may be embodied as or otherwise include an apparatus 100 as generically represented by the block diagram of FIG. 3. In the example embodiment, the apparatus 100 may comprise various means for performing the various functions herein described. These means may comprise one or more of a processor 110, memory 112, communication interface 114, user interface 116, or subscription update circuitry 118. The means of the apparatus 100 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 112) that is executable by a suitably configured processing device (for example, the processor 110), or some combination thereof.

In some example embodiments, one or more of the means illustrated in FIG. 3 may be embodied as a chip or chip set. In other words, the apparatus 100 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or subscription update circuitry 118 may be embodied as a chip or chip set. The apparatus 100 may therefore, in some example embodiments, be configured to implement embodiments of the present invention on a single chip or as a single "system on a chip." As another example, in some example embodiments, the apparatus 100 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the apparatus 100 as described herein. The plurality of processors may be embodied on a single computing device or distributed across a plurality of computing devices collectively configured to function as the apparatus 100. In embodiments wherein the apparatus 100 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the apparatus 100 to perform one or more of the functionalities of the apparatus 100 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the apparatus 100. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 100 is embodied as a mobile terminal 10, the memory 112 may comprise the volatile memory 40 and/or the non-volatile memory 42. The memory 112 may be configured to store information, data, applications, instructions, or the like for enabling the apparatus 100 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the subscription update circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 100 and one or more computing devices or computing resources may be in communication. As an example, the communication interface 114 may be configured to enable communication between the apparatus 100 and another device, such as another terminal apparatus 102 or serving network apparatus 104. As a further example, the communication interface 114 may be configured to enable communication with another terminal apparatus 102 or serving network apparatus 104 via the network 106. The communication interface 114 may additionally be in communication with the memory 112, user interface 116, and/or subscription update circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or subscription update circuitry 118, such as via a bus.

The subscription update circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the subscription update circuitry 118 is embodied separately from the processor 110, the subscription update circuitry 118 may be in communication with the processor 110. The subscription update circuitry 118 may further be in communication with one or more of the memory 112, communication interface 114, or user interface 116, such as via a bus.

As noted above, in some embodiments, the terminal apparatus 102, serving network apparatus 104, and/or subscription broker 110 may be embodied as or otherwise include an apparatus 100 as generically represented by the block diagram of FIG. 3. While the apparatus 100 may be embodied, for example, as a mobile terminal 10 in the case of a terminal apparatus 102 and/or a server in the case of a subscription broker 110, it should be noted that the components, devices or elements described above may not be mandatory and thus some may be omitted in certain embodiments. Additionally, some embodiments may include further or different components, devices or elements beyond those shown and described herein. While the following example embodiments are described with respect to one or more terminal apparatuses 102, one or more serving network apparatuses 104, and/or one or more subscription brokers 110, it should be appreciated that these elements may be embodied as or otherwise include an apparatus 100, and thus the functionality of the one or more terminal apparatuses 102, one or more serving network apparatuses 104, and/or one or more subscription brokers 110 described in the following example embodiments may be performed by various means of the apparatus 100 and/or its components, devices, or elements (for example, means, such as the processor 20, the processor 110, or the like).

According to example embodiments, a terminal apparatus 102 may be configured to connect to a network (for example, network 106) controlled by a network operator. In this regard, a subscription broker 110 may provide the terminal apparatus 102 with a subscription from the network operator. During the subscription, the terminal apparatus 102 may be identified and located within the network using one or more device identifiers. For example, the one or more device identifiers may comprise a mobile subscriber integrated services digital network number (MSISDN) and/or the like. Additionally, the subscription may have one or more associated subscription identifiers. For example, the one or more subscription identifiers may comprise an international mobile subscriber identity (IMSI), a temporary mobile subscriber identity (TMSI), a packet TMSI (P-TMSI), an ICC-ID, and/or the like. The MSISDN may represent, in certain instances, a phone or mobile number for reaching the terminal apparatus 102 within the network. The IMSI may represent a unique identifier for the terminal apparatus 102, for example, associated with a USIM (for example, a software USIM) of the terminal apparatus 102.

The subscription identifier (for example, IMSI) may be provisioned to the terminal apparatus 102, in various embodiments, by the subscription broker 110. The device identifier (for example, MSISDN) may be sent by the subscription broker 110 to the network for storage, where it may be mapped to the subscription identifier (for example, IMSI). In this regard, the subscription broker 110 may be configured to maintain information about the device identifiers (for example, MSISDN) and/or subscription identifiers (for example, IMSI) provisioned to terminal apparatuses 102 or associated with the corresponding subscriptions, for example which MSISDNs and/or IMSIs are currently associated with a terminal apparatus 102 and its corresponding subscription, which MSISDN and/or IMSI is associated with a particular terminal apparatus 102 and its subscription, which MSISDNs and/or IMSIs have previously been associated with a terminal apparatus 102 and its subscription (whether currently active or inactive), and/or the like. In some embodiments, the IMSI may initially be associated with the terminal apparatus 102 via, for example, a SIM card installed in the terminal apparatus 102, and a different IMSI may be provisioned by the subscription broker 110 in an instance in which the IMSI is to change from the initial value.

In example embodiments, the terminal apparatus 102 may receive a new subscription to a network controlled by a network operator different than the network operator for the current subscription. In this regard, the subscription broker 110 may identify a new subscription for the terminal apparatus 102 that is preferred over the terminal apparatus's 102 current subscription. For example, the new subscription may provide the terminal apparatus 102 with improved range of connectivity, improved quality of connectivity, preferred services, lower costs, and/or the like. The determination by the subscription broker 110 to transfer the terminal apparatus 102 to a new subscription, in certain instances, may be based at least in part on the current location of the terminal apparatus 102. That is, in an instance in which the terminal apparatus 102 has moved since the provisioning of the original subscription, the subscription broker 110 may determine that another subscription may be preferable to the original subscription at the terminal apparatus's 102 updated location.

The subscription broker 110 may provide for transmission of subscription information related to the new subscription to the terminal apparatus 102. In some embodiments, the subscription information may comprise an indication of a new device identifier (for example, MSISDN) and/or subscription identifiers (for example, IMSI) associated with the terminal apparatus 102 and the new subscription. The terminal apparatus 102 may be configured to use the subscription information to establish a connection with the network associated with the new subscription. In some embodiments, the new subscription may replace the previous subscription, and, in other embodiments, the new subscription may only be used temporarily (for example, while the user is traveling). The terminal apparatus 102 may further update the subscription information stored in the terminal apparatus 102 with the provided subscription information associated with the new subscription.

In various embodiments, the subscription broker 110 may be configured to update one or more entities with the new subscription information of the terminal apparatus 102. For example, in an instance in which the device identifier (for example, MSISDN) associated with the terminal apparatus 102 changes as a result of the new subscription, the subscription broker 110 may be configured to notify one or more entities of the updated device identifier (for example, MSISDN). In some embodiments, the subscription broker 110 may provide for transmission of updated subscription identifier (for example, IMSI) information to an entity in the network (for example, a home location register (HLR)) responsible for maintaining a record of the subscription identifiers (for example, IMSIs) associated with the terminal apparatuses 102 in the network. In other embodiments, a serving network apparatus 104 may be configured to provision the new subscription identifiers (for example, ISMIs) and update the network accordingly.

The terminal apparatus 102 may further be configured to notify and/or update one or more devices with the new subscription information. In example embodiments, the terminal apparatus 102 may belong to an ecosystem along with one or more other devices (for example, terminal apparatuses 102). One or more of the other devices in the ecosystem may be associated with a social network of the terminal apparatus 102 and/or may be subscribed to a subscription service provided by the subscription broker 110. In some instances, the one or more devices of the ecosystem to be notified may comprise one or more devices identified in a phone book associated with the terminal apparatus 102, identified in a call or message log of the terminal apparatus 102, and/or the like. A list of the one or more devices to be notified may be stored, for example, in a connection map (or social map).

The connection map may be maintained by the terminal apparatus 102 and/or the subscription broker 110. In other embodiments, the connection map may be maintained in a serving network apparatus 104, for example, as part of a cloud service. The connection map may comprise contact details and/or information associated with the one or more devices listed therein. In this regard, the connection map may be used by the terminal apparatus 102 and/or subscription broker 110 to contact the one or more devices listed therein and to notify them of the new subscription information of the terminal apparatus 102.

The terminal apparatus 102 may be configured to provide for transmission of the connection map to the subscription broker 110 in order to update the one or more devices identified in the map. In some instances, the terminal apparatus 102 may not need to provide the connection map to the subscription broker 110, for example, in an instance in which the subscription broker 110 maintains a copy of the connection map or may access the connection map from another network device (for example, a serving network apparatus 104 providing a cloud service). In example embodiments, the subscription broker 110 may be configured to send a message to each of the one or more devices identified in the connection map using the contact information for those devices also contained in the connection map. The message may comprise an indication of the new subscription information associated with the terminal apparatus 102 (for example, the new MSISDN). The subscription broker 110 may further be configured to update a remote phone book associated with each of the one or more devices. For example, the subscription broker 110 may update a phone book stored as a part of a cloud service that the one or more devices access when contacting the terminal apparatus 102.

After the update, a user of one of the notified devices (for example, another terminal apparatus 102) may attempt to contact the terminal apparatus 102. In some instances, the user of the device may first log in or check in to the ecosystem before receiving the updated subscription information for the terminal apparatus 102. For example, the user may access software or a service associated with the ecosystem that is configured to provide the device with the new subscription information. In other instances, the other device may attempt to contact the terminal apparatus 102 prior to logging in or checking in to the ecosystem. In these instances, the attempt to contact the terminal apparatus 102 may fail, and in response, the device may automatically log in or check in to the ecosystem to check for updated contact information for the terminal apparatus 102. In yet other instances, the subscription broker 110 may have already updated the contact information on the one or more devices such that a subsequent attempt to contact the terminal apparatus 102 will use the new subscription information associated with the terminal apparatus 102.

In other embodiments, the subscription broker 110 may update users of one or more devices outside of the ecosystem (for example, land line devices). In these embodiments, the user of the device may attempt to contact the terminal apparatus 102 using the old subscription information (for example, the old MSISDN of the terminal apparatus 102). A serving network apparatus 104 associated with the network may determine that the user is attempting to make an invalid call, for example, if the old MSISDN of the terminal apparatus 102 is no longer valid. The serving network apparatus 104 may be configured to determine the subscription broker 110 associated with the no longer valid MSISDN. The serving network apparatus 104 may then contact the subscription broker 110 to request the updated contact information for the terminal apparatus 102. The subscription broker 110 may provide the new subscription information of the terminal apparatus 102 (for example, the new MSISDN of the terminal apparatus 102) to the serving network apparatus 104. The user of the device may then be notified of the updated subscription information for the terminal apparatus 102. For example, the device may automatically attempt to contact the terminal apparatus 102 after receiving the updated subscription information. In another example, the user of the device may be notified of the updated subscription information, for example, via a voice prompt of a user interface. In yet another example, the phone book of the device may be updated with the new subscription information of the terminal apparatus 102.

FIGS. 4 and 5 are flowcharts illustrating the operations performed by a method, apparatus, and computer program product, such as apparatus 100 of FIG. 3, from the perspective of a subscription broker 110 with respect to FIG. 4 and from the perspective of a terminal apparatus 102 with respect to FIG. 5, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 112 of an apparatus 100 employing an embodiment of the present invention and executed by a processor 110 in the apparatus, in some instances via subscription update circuitry 118.

As will be appreciated, any such computer program instructions may be loaded onto a computer or other programmable apparatus (for example, hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

As such, the operations of FIGS. 4 and 5, when executed, convert a computer or processing circuitry into a particular machine configured to perform an example embodiment of the present invention. Accordingly, the operations of FIGS. 4 and 5 define an algorithm for configuring a computer or processing circuitry, for example, processor 110, to perform an example embodiment. In some cases, a general purpose computer may be provided with an instance of the processor which performs the algorithm of FIGS. 4 and 5 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Referring now to FIG. 4, the operations performed by a method, apparatus and computer program product of an example embodiment are illustrated from the perspective of a subscription broker 110. The method may comprise establishing a first subscription associated with a first network operator for a device at operation 400. At operation 410, the method may comprise transferring the device from the first subscription associated with the first network operator to a second subscription associated with a second network operator. Additionally, the method may comprise updating one or more other devices identified in a connection map associated with the device of the transfer to the second subscription at operation 420.

Referring now to FIG. 5, the operations performed by a method, apparatus and computer program product of an example embodiment are illustrated from the perspective of a terminal apparatus 102. The method may comprise changing from a first subscription associated with a first network operator to a second subscription associated with a second network operator at operation 500. Changing from the first subscription to the second subscription may comprise modifying at least one of a mobile subscriber integrated services digital network number and an international mobile subscriber identity. At operation 510, the method may comprise updating one or more devices identified in a connection map with the modified at least one of the mobile subscriber integrated services digital network number and the international mobile subscriber identity.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A method comprising:
    transferring one or more devices from a first subscription associated with a first network operator to a second subscription associated with a second network operator, wherein transferring from the first subscription to the second subscription comprises modifying a device identifier;
    updating the one or more devices identified in a connection map with the modified device identifier, wherein the connection map is associated with a social network with which the one or more of the devices subscribed to a subscription service are associated and the connection map comprises contact information associated with the one or more devices;
    causing the one or more devices to be notified of second subscription information based upon the connection map by causing a message to be sent to each of the one or more devices identified in the connection map using the contact information for those devices also contained in the connection map, wherein the message comprises an indication of the second subscription information; and
    updating a phone book that the one or more devices access with the second subscription information.

2. The method of claim 1, wherein transferring from the first subscription to the second subscription further comprises changing from a first subscription identifier associated with the first subscription to a second subscription identifier associated with the second subscription.

3. The method of claim 2, wherein the device identifier comprises a mobile subscriber integrated services digital network number, wherein the first subscription identifier comprises an international mobile subscriber identity, and wherein the second subscription identifier comprises an international mobile subscriber identity.

4. The method of claim 1, wherein transferring from the first subscription to the second subscription further comprises receiving the second subscription associated with the second network operator from a subscription broker.

5. The method of claim 1, wherein the connection map comprises a list of one or more devices subscribed to a subscription service provided by a subscription broker.

6. The method of claim 1, wherein updating the one or more devices identified in a connection map further comprises:
    retrieving the connection map from storage; and
    providing for transmission of the connection map to a subscription broker.

7. An apparatus comprising at least one processor; and at least one memory including computer program code, wherein the at least one memory and the computer program code are arranged to, with the at least one processor, cause the apparatus to at least:
    transfer one or more devices from a first subscription associated with a first network operator to a second subscription associated with a second network operator, wherein transferring from the first subscription to the second subscription comprises modifying a device identifier associated with the apparatus;
    update the one or more devices identified in a connection map with the modified device identifier associated with the apparatus, wherein the connection map is associated with a social network with which the one or more of the devices subscribed to a subscription service are associated and the connection map comprises contact information associated with the one or more devices;

cause the one or more devices to be notified of second subscription information based upon the connection map, wherein a message was sent to each of the one or more devices identified in the connection map using the contact information for those devices also contained in the connection map, wherein the message comprises an indication of the second subscription information; and update a phone book that the one or more devices access with the second subscription information.

8. The apparatus of claim 7, wherein in order to transfer from the first subscription to the second subscription, the at least one memory and the computer program code are further arranged to, with the at least one processor, cause the apparatus to change from a first subscription identifier associated with the first subscription to a second subscription identifier associated with the second subscription.

9. The apparatus of claim 8, wherein the device identifier comprises a mobile subscriber integrated services digital network number, wherein the first subscription identifier comprises an international mobile subscriber identity, and wherein the second subscription identifier comprises an international mobile subscriber identity.

10. The apparatus of claim 7, wherein in order to transfer from the first subscription to the second subscription, the at least one memory and the computer program code are further arranged to, with the at least one processor, cause the apparatus to receive the second subscription associated with the second network operator from a subscription broker.

11. The apparatus of claim 7, wherein the connection map comprises a list of one or more devices subscribed to a subscription service provided by a subscription broker.

12. The apparatus of claim 7, wherein in order to update the one or more devices identified in a connection map, the at least one memory and the computer program code are further arranged to, with the at least one processor, cause the apparatus to:

retrieve the connection map from storage; and provide for transmission of the connection map to a subscription broker.

13. A computer program product comprising at least one non-transitory computer-readable storage medium having computer-readable program instructions stored therein with the computer-readable program instructions comprising program instructions arranged to:

transfer one or more devices from a first subscription associated with a first network operator to a second subscription associated with a second network operator, wherein transferring from the first subscription to the second subscription comprises modifying a device identifier;

update the one or more devices identified in a connection map with the modified device identifier, wherein the connection map is associated with a social network with which the one or more of the devices subscribed to a subscription service are associated and the connection map comprises contact information associated with the one or more devices;

cause the one or more devices to be notified of second subscription information based upon the connection map, wherein a message was sent to each of the one or more devices identified in the connection map using the contact information for those devices also contained in the connection map, wherein the message comprises an indication of the second subscription information; and update a phone book that the one or more devices access with the second subscription information.

14. The computer program product of claim 13, wherein in order to transfer from the first subscription to the second subscription, the program instructions are further arranged to change from a first subscription identifier associated with the first subscription to a second subscription identifier associated with the second subscription.

15. The computer program product of claim 14, wherein the device identifier comprises a mobile subscriber integrated services digital network number, wherein the first subscription identifier comprises an international mobile subscriber identity, and wherein the second subscription identifier comprises an international mobile subscriber identity.

16. The computer program product of claim 13, wherein in order to transfer from the first subscription to the second subscription, the program instructions are further arranged to receive the second subscription associated with the second network operator from a subscription broker.

17. The computer program product of claim 13, wherein the connection map comprises a list of one or more devices subscribed to a subscription service provided by a subscription broker.

18. The computer program product of claim 13, wherein in order to update the one or more devices identified in a connection map, the program instructions are further arranged to:

retrieve the connection map from storage; and provide for transmission of the connection map to a subscription broker.

* * * * *